Feb. 5, 1963    I. GÁL ETAL    3,076,915
CATHODE ASSEMBLY AND METHOD OF MAKING SAME
Filed Dec. 22, 1955

INVENTORS
IMRE GÁL
BY   FERENC NAGEL
ENDRE OLDAL
Blum, Moscovitz, Friedman
and Blum
Attorneys United States Patent Office 3,076,915
Patented Feb. 5, 1963

3,076,915
CATHODE ASSEMBLY AND METHOD OF
MAKING SAME
Imre Gál, Ferenc Nágel, and Endre Oldal, Budapest Hungary, assignors to Egyesült Izzólámpa és Villamosság Részvénytársaság, Budapest, Hungary, a Hungarian enterprise
Filed Dec. 22, 1955, Ser. No. 554,804
Claims priority, application Hungary Dec. 24, 1954
10 Claims. (Cl. 313—346)

This invention relates to cathode assemblies and is concerned in particular with cathodes provided with a reserve supply of activating material and a covering for the same, said covering being constituted of a refractory porous material.

This kind of cathodes comprises a chamber containing a supply of the activating material and a second chamber containing a heating means, the two chambers being separated from one another by a partition wall, whereby the walls of the chamber containing the activating material consist at least partly of a refractory porous material, the pores of said porous material forming the only passages from within said chamber. During working of the cathode the activating material diffuses through the pores on to the outer surface of said porous body forming the covering of the chamber containing said activating material.

Since this kind of cathodes, the so-called reserve supply cathodes, are generally of very small dimensions, it causes substantial difficulties to manufacture the cathode in such a manner that the pores of the refractory porous body be the only passages from within the chamber containing the activating material. Difficulties arise also in separating the supply chamber from the chamber containing the heating means. In order to connect the refractory porous body with the non porous part of the walls of the supply chamber and to arrange a partition wall between the supply chamber and the heating chamber in reserve supply cathodes suggested or used heretofore, welded joints had to be provided. Obviously serious difficulties had to be overcome resulting from the very small dimensions of these cathodes having frequently diameters of about 10 mm.

One object of the invention is to provide an electrode which is easier to manufacture than those in use in the present time, is highly electron emissive and remains so for a long time.

A further object of the invention is to provide a cathode substantially without any welded parts in it and thus especially adapted to wholesale production. Since the cathode according to this invention is assembled without application of any heat in the neighborhood of the activating material, this material is not exposed to injuries caused by heat with cathodes of known construction.

Still another object of the invention is a method of making an electrode of the kind referred to above for electric discharge devices.

An accordance with the present invention a cathode assembly is provided comprising a first cylindrical container one end of which being closed by a refractory porous body, a second cylindrical container closed at one end and tightly fitted in said first cylindrical container, the top parts of said two cylindrical containers enclosing a chamber, the pores of said refractory porous body forming the only passages from within said chamber, an activating material provided in said chamber and supplying the electron emitting substance through the pores of said porous body and heating means provided in the inner space of said second cylindrical container. The first cylindrical container closed at one end by said refractory porous body is bordered inwardly and the edges of the container and of the porous body overlap one another either on one side or on both sides of the edges.

The invention will be explained with greater particularity in connection with the accompanying drawing, in which.

Figure 1:
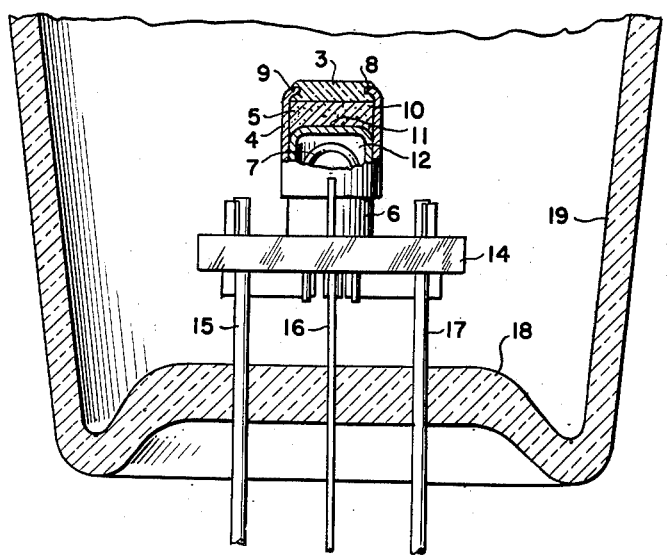
FIGURE 1 illustrates in vertical section a cathode assembly embodying the invention.

Referring to FIGURE 1 a first cylindrical container 4 of a refractory metal, such as molybdenum, tungsten, tantalum or the like is bordered inwardly at its upper end and is closed at this end by means of a refractory porous body 3. We prefer to make the porous body 3 of sintered tungsten, but molybdenum, niobium or tantalum may also be used. The edge 8 of the first cylindrical container 4 is overlapped on both sides by the edges 9 and 10 of the porous body 3.

Tightly fitted into the first cylindrical container 4 is a second cylindrical container 6 closed at its upper end 11 and located so that the porous body 3, a part of the wall of the cylindrical container 4, and the top 11 of the second cylindrical container form a chamber 5 containing an activating material such as alkaline earth metal compounds or like materials such as enumerated in the co-pending application Ser. No. 429,955, now Patent No. 2,902,621. The only passages from within this reservoir chamber 5 are formed by the pores of the sintered porous body 3. The vaporizable activating material provided in the chamber 5 diffuses through the pores of the body 3 and produces upon the outer surface of the body 3 a thin layer of molecular thickness of emissive material, as known in the art. The inner space 12 of the second cylindrical container 6 forms a heating chamber and contains a heating body, such as a filament 7.

The second cylindrical container 6 is at its lower end supported by an insulating plate 14 made of ceramic material which again is supported by lead-in wires 15 and 17 of the filament 7, passing through the glass stem 18 of the usual envelope 19 of an electric discharge device. 16 is a lead-in to the cathode which may also serve for additionally fixing the container 4 to the insulating plate 14.

The overlapping edges 8, 9 and 10 of the first cylindrical container 4 and the porous body 3 form a hermetically sealed joint so that vapors of the activating material enclosed in the chamber 5 cannot pass from within the chamber but through the pores of the body 3.

Figure 2:
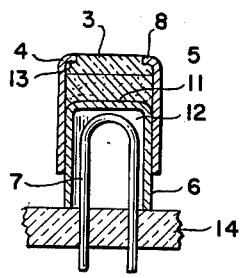
FIGURE 2 is a side elevation and partly a longitudinal section of a cathode embodying another modification of the invention.

The embodiment shown in FIGURE 2 differs from that of FIGURE 1 only in that the porous body 3 closing the upper end of the first cylindrical container 4 overlaps the edge 8 of this container only on its inner side at 13.

According to the preferred method of making the cathode described above the cylindrical container 4 bordered inwardly and made e.g. of molybdenum is put with its bordered end downwardly into the hollow of a suitable press mould. After putting a quantity of pulverized tungsten sufficient to form the body 3 into the container 4 the powder is pressed under a pressure of about 10–30 tons/cm.$^2$ into a self-sustaining closing body of the form shown in FIGURE 2, whereby the edge 13 of the body 3 overlaps the bordered edge 8 of the cylindrical container 4. According to the shape of the tools used for the pressing operation any other form of the body 3 may be obtained.

After removing the cylindrical container 4 from the press mould together with the closing body 3 now forming an integral unit with the container 4, it is heat treated at a temperature below the melting point of said powdered refractory metal, say of about 1400–1900° C. for about e.g. ten minutes in a nonoxidizing atmosphere, whereby the body 3 is sintered and forms a unit with the cylindrical container 4 made of molybdenum.

In order to form a porous body 3 overlapping the edge 8 of the cylindrical container 4 on both sides as shown in FIGURE 1 first a small quantity of powdered tungsten is put in the press mould sufficient to form the upper part of the body 3, then the bordered cylindrical container 4 is set with its bordered end down upon said quantity of powdered tungsten, then again a quantity of powdered tungsten sufficient to form the lower part of the body 3 is put into said first container and then the pressing and sintering operations are performed as described above.

After the sintering process has been finished the activating material is brought into the cylindrical container 4 which is again turned upside down. The activating material may be in powdered state or in the form of a pastil or lozenge. Then the second cylindrical container 6 preferably made of the same metal as the first cylindrical container is pressed into the first cylindrical container 4, whereby the inner diameter of the container 4 and the outer diameter of the container 6 are so chosen that after the pressing operation the two containers 4 and 6 fit tightly into one another and form an integral body. The closing body 3 and the top 11 of said second cylindrical container 6 are in a juxtaposed relationship thus forming the chamber 5 enclosing said activating material.

Instead of filling the activating material into the chamber 5 before the second container 6 is pressed into the first container 4, the activating material in the form of a pastil or lozenge may be fixed upon the outer surface of the top 11 of the container 6 by means of a suitable binding material such as collodion, and then the container 6 pressed into the container 4 together with said activating material.

The heating filament 7 which may preferably be coated with aluminum oxide and the insulating support 14 may be assembled in any known manner. Then the cathode is assembled in the container of an electric discharge tube and activated in any known manner.

Although we have shown and described certain specific embodiments of our invention, we are fully aware that many modifications thereof are possible. Our invention, therefore, is not to be restricted, except insofar as is necessitated by the prior art.

What we claim is:

1. A cathode assembly comprising a first container, said first container comprising a non-porous, cylindrical, open-ended first peripheral wall and a transverse disc-like, flat, porous, refractory end wall extending closingly into one end of said peripheral wall, said porous end wall being formed of pressable, sinterable particles, said end wall being pressed and sintered in situ and being thereby sealingly bonded to said first peripheral wall, and a second, non-porous container comprising a cylindrical second peripheral wall having a transverse, unitary end wall closure, said second peripheral wall extending into said first peripheral wall with said second peripheral wall frictionally slidably abutting said first peripheral wall and with said end wall closure of said second container proximate to said porous end wall and spaced therefrom to define a chamber therebetween, an activating material in said chamber and adapted when heated to emit vapors which can pass from said chamber only through the pores of said porous end wall, and heating means for said activating material mounted in the inner space of said second container.

2. A cathode assembly according to claim 1, said first peripheral wall having a transverse, inturned, annular, peripheral flange, said flange extending frictionally into the side of said porous end wall.

3. A cathode assembly according to claim 1, said peripheral wall having an inturned, transverse, annular, peripheral end flange, said flange extending frictionally into the side of said porous end wall and being overlapped on both end faces thereof by said porous end wall.

4. A cathode assembly comprising a first container, said first container comprising a non-porous, cylindrical, open-ended first peripheral wall made of a metal selected from the group consisting of molybdenum, tungsten and tantalum, and a transverse disc-like, flat, porous, refractory end wall extending closely into one end of said first peripheral wall, said porous end wall being formed of pressable, sinterable particles selected from the group consisting of tungsten, molybdenum, niobium and tantalum, said end wall being pressed and sintered in situ and being thereby sealingly bonded to said first peripheral wall, said first peripheral wall having a transverse, inturned, annular, peripheral end flange extending into the side of said porous end wall with said porous end wall overlapping the respective end faces of said flange, and a second, non-porous container comprising a cylindrical second peripheral wall having a transverse, unitary end wall closure, said second peripheral wall extending into said first peripheral wall with said second peripheral wall frictionally slidably abutting said first peripheral wall and with said end wall closure of said second container proximate to said porous end wall and spaced therefrom to define a chamber therebetween, an activating material in said chamber and adapted when heated to emit vapors which can pass from said chamber only through the pores of said porous end wall, and heating means for said activating material mounted in the inner space of said second container.

5. The method of making a cathode assembly having a reserve supply of activating material enclosed in the chamber providing pore-like paths for said activating material, comprising the steps of compacting pressable, sinterable particles in one end of the peripheral wall of a non-porous, cylindrical, open-ended, container to form a transverse, disc-like, flat, porous, refractory end wall extending closingly into one end of said container, pressing and sintering said end wall particles in situ so as to bond them sealingly to said first cylindrical container, then locating inside said first cylindrical container and adjacent its end wall an activating material which is adapted to emit vapors when heated which pass through the pores of said activating material, and pressing the peripheral wall of a second cylindrical container closed at one end into the peripheral wall of said first cylindrical container with said peripheral walls frictionally slidably abutting each other and with the closed end of said second cylindrical container proximate to the end wall of said first cylindrical container and spaced therefrom to define the chamber in closing said activating material, and providing heating means in the inner space of said second cylindrical container.

6. Method according to claim 5, said method also comprising turning said one end of said first container inwardly to form a transverse flange and compacting said particles in such a way that said flange extends frictionally onto said porous end wall.

7. Method according to claim 5, said first container being of molybdenum.

8. The method of making a cathode assembly having a reserve supply of activating material enclosed in the chamber providing pore-like paths for said activating material, comprising the steps of turning inwardly one end of the peripheral wall of a first cylindrical container to provide a transverse, annular end flange, placing powdered refractory metal into a press mold, setting said first container in said press mold with said flange against said powdered refractory metal, placing additional refractory metal into said first container, pressing said metal particles to form a transverse, disc-like, flat, porous, refractory end wall extending closingly into said end of said container and overlapping the respective end faces of said flange, sintering said end wall particles in situ so as to bond them sealingly to said first cylindrical container, then locating inside said first cylindrical container and adjacent its end wall an activating material which is adapted to emit vapors when heated which pass through the pores of said activating material, and pressing the peripheral wall of a second cylindrical container closed at one end into the peripheral wall of said first cylindrical container with said peripheral walls frictionally slidably abutting each other and with the closed end of said second cylindrical container proximate to the end wall of said first cylindrical container and spaced therefrom to define the chamber in closing said activating material, and providing heating means in the inner space of said second cylindrical container.

9. Method acording to claim 8, the sintering step being performed at a temperature between 1,400 and 1,900° C.

10. The method of making a cathode assembly having a reserve supply of activating material enclosed in the chamber providing pore-like paths for said activating material, comprising the steps of compacting pressable, sinterable particles in one end of the peripheral wall of a non-porous, cylindrical, open-ended container to form a transverse, disc-like, flat, porous refractory end wall extending closingly into one end of said container, pressing and sintering said end wall particles in situ so as to bond them sealingly to said first cylindrical container, fixing an activating material upon the outer face of the end wall of a second cylindrical container, then pressing the peripheral wall of the second cylindrical container into the peripheral wall of said first cylindrical container with said peripheral walls frictionally slidably abutting each other and with the closed end of said second cylindrical container proximate to the end wall of said first cylindrical container and spaced therefrom to define the chamber enclosing said activating material, and providing heating means in the inner space of said second cylindrical container.

References Cited in the file of this patent

UNITED STATES PATENTS

| | | |
|---|---|---|
| 2,543,728 | Lemmens et al. | Feb. 27, 1951 |
| 2,604,603 | McLinden | July 22, 1952 |
| 2,677,873 | Buck | May 11, 1954 |
| 2,722,626 | Coppola et al. | Nov. 1, 1955 |
| 2,912,611 | Beck et al. | Nov. 10, 1959 |
| 2,925,514 | Lemmens et al. | Feb. 16, 1960 |

FOREIGN PATENTS

| | | |
|---|---|---|
| 713,140 | Great Britain | Aug. 4, 1954 |